May 5, 1964 C. W. NEWELL 3,132,305

GAIN CONTROL CIRCUIT UTILIZING A BEAM DEFLECTION TUBE

Filed April 10, 1959

CHESTER W. NEWELL
*INVENTOR.*

BY

Flehr and Swain
ATTORNEYS

United States Patent Office 3,132,305

Patented May 5, 1964

3,132,305

GAIN CONTROL CIRCUIT UTILIZING A BEAM DEFLECTION TUBE

Chester W. Newell, Sunnyvale, Calif., assignor to Ampex Corporation, Redwood City, Calif., a corporation of California

Filed Apr. 10, 1959, Ser. No. 805,504

2 Claims. (Cl. 330—46)

Figures 1, 2:
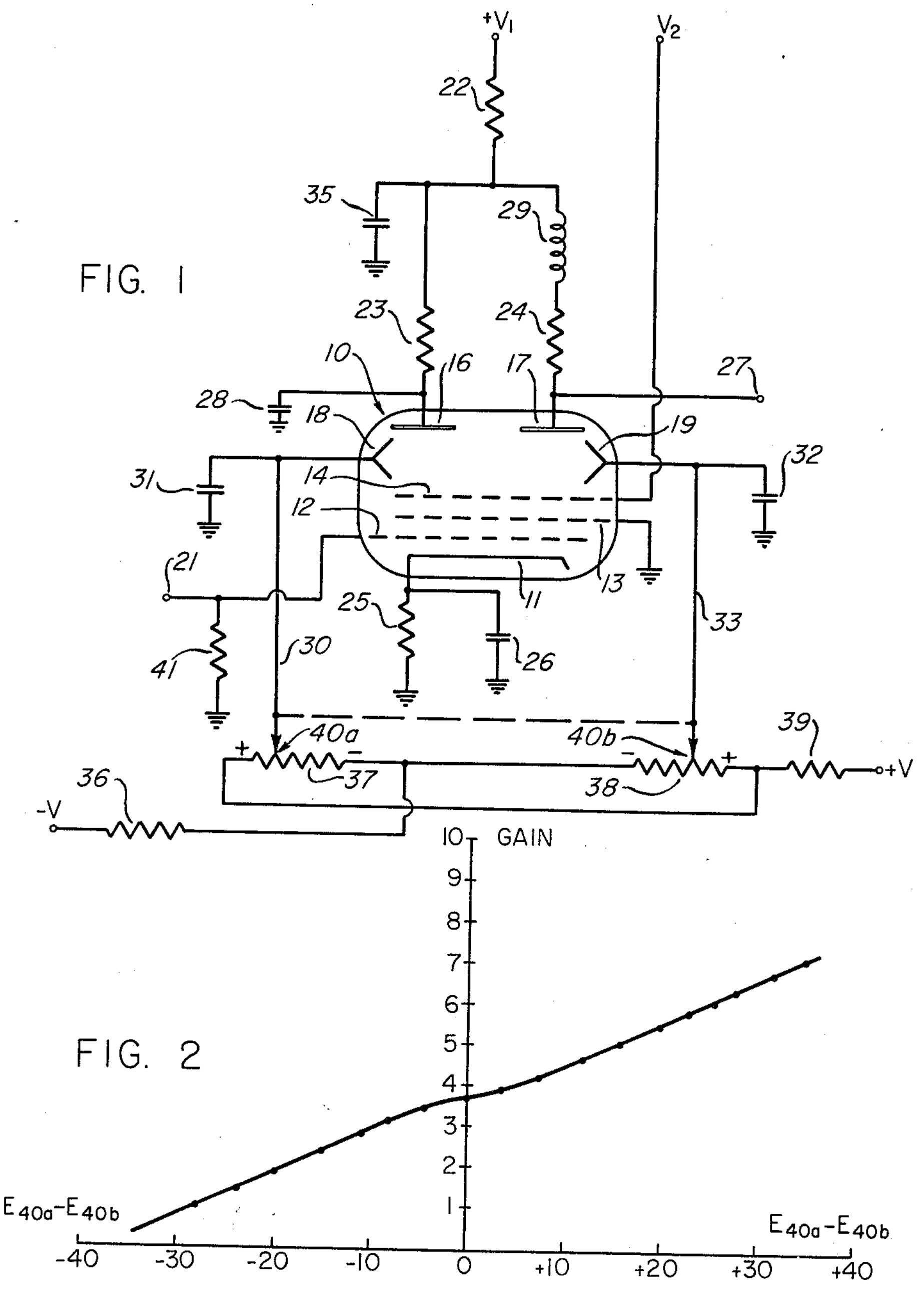

This invention relates generally to a gain control and more particularly to a remote gain control.

In many applications, remote gain controls which employ vacuum tubes having variable amplification factors ($\mu$) introduce unacceptable distortion in the amplified signal. For example, when handling color television signals, excessive phase errors and differential gain are introduced. The component color signals cannot be recovered by a receiver without undesirable distortion.

It is a general object of the present invention to provide an improved gain control suitable for adapting to remote or automatic gain control.

It is another object of the present invention to provide a gain control in which the gain is controlled by the deflection of an electron beam.

These and other objects of the invention will become more clearly apparent from the following description when taken in conjunction with the accompanying drawings.

Referring to the drawing:

FIGURE 1 is a circuit diagram of a gain control in accordance with the invention; and FIGURE 2 shows gain as a function of voltage applied to the control terminals of the circuit of FIGURE 1.

In accordance with the present invention, an electron beam is modulated in accordance with a signal whose amplification it is desired to control. The beam is deflected whereby the proportion of the beam striking a plate (collector) associated with an output circuit is varied in accordance with a control signal.

Referring to FIGURE 1, a suitable beam type tube 10 is illustrated. The tube includes a single cathode 11, control grid 12, focus grid 13, accelerator grid 14 and a pair of anodes 16 and 17 which are adapted to receive the electrons emitted from the cathode surface. The electrons are in the form of a beam. Deflection plates 18 and 19 are provided for deflecting the beam between the anodes 16 and 17, respectively. The tube elements are connected so that the tube operates as a conventional amplifier. Thus, the input signal is applied to the grid at terminal 21. Anode voltage is applied through the resistive network including the resistors 22, 23 and 24. Suitable biasing resistor 25 and bypass capacitor 26 are connected to the cathode. The output signal is obtained at anode 17 and is available at terminal 27. The anode 16 is grounded through a capacitor 28. However, an output terminal may be connected to this anode 16 to obtain another amplified signal whose amplification varies inversely with that available at terminal 27. A series peaking inductance 29 is connected in the anode circuit of the anode 17 to linearize the operation. Voltage is applied to the suppressor grid 14.

The deflection plates are grounded to high frequency signals through the capacitors 31 and 32. Suitable deflection voltages are applied to the deflection plates 18 and 19 along the leads 30 and 33, respectively. These leads may be connected to a remote gain control which serves to provide a differential voltage to the lines 30 and 33. A voltage divider suitable for applying a differential voltage is illustrated by way of example in FIGURE 1. The resistive divider includes serially connected variable resistors 37 and 38. Negative voltage is applied to the common terminal of the resistors through resistor 36. Positive voltage is applied to the other terminals through resistor 39. The voltage applied between the plates 18 and 19 is obtained at the variable taps 40 of the resistors 37 and 38 and is varied by varying the position of the taps *40a* and *40b*. Any other method of providing a differential voltage is equally satisfactory.

In one particluar example, a circuit in accordance with the foregoing was constructed in which the various components and voltages had the following values:

| | | |
|---|---|---|
| Tube 10 | | 6AR8 |
| Voltage: | | |
| $+V_1$ | volts | 250 |
| $+V_2$ | do | 250 |
| $-V$ | do | −150 |
| Resistors: | | |
| 22 | ohms | 5K |
| 23 | do | 2.7K |
| 24 | do | 2.7K |
| 25 | do | 150 |
| 36 | do | 15K |
| 37 | do | 10K |
| 38 | do | 10K |
| 39 | do | 27K |
| 41 | megohms | 1 |
| Capacitors: | | |
| 26 | mmf | .1 |
| 28 | mmf | 0.1 |
| 31 | mmf | 0.1 |
| 32 | mmf | 0.1 |
| 35 | $\mu$f | 20 |
| Inductor 29 | $\mu$h | 8–15 |

A circuit in accordance with the foregoing was tested. The results of the test are shown in FIGURE 2 which shows gain as a function of control voltage. The vertical axis represents gain and the horizontal axis represents the difference between the voltage applied to the deflection plates. The distortion was measured and found to be less than two percent with a 0 to 6 mc. signal applied. It is seen from the curve that the control gain function is relatively linear with the exception of a very slight curvature in the region where the voltage applied to the deflection plates is equal.

I claim:

1. A beam vacuum tube gain control circuit comprising: a cathode coupled to a source of reference potential; first and second anodes positioned adjacent to each other and equally spaced from said cathode; means for applying a single voltage to said anodes so that an electron beam is projected between said cathode and said anodes; a control grid disposed between said anodes and said cathode; means for applying an input signal to said control grid; first and second beam deflecting elements located adjacent to said first and second anodes respectively; means for applying a differential voltage to said deflecting elements, said means including a voltage divider having separate variable resistance means with variable taps being connected to each of said deflecting elements; and means for deriving separate output signals from said first anode and said second anode respectively the magnitude of the output signal at each of said anodes being dependent upon the differential voltage applied to the respective deflecting plate.

2. A beam vacuum tube gain control circuit comprising: a cathode coupled to a source of reference potential; first and second anodes positioned adjacent to each other and equally spaced from said cathode; means for applying a single voltage to said anodes so that an electron beam is projected between said cathode and said anodes; a control grid disposed between said anodes and said cathode; means for applying an input signal to said control grid; first and second beam deflecting elements located adjacent to said first and second anodes respectively; means for applying a differential voltage to said deflecting elements, said means including a voltage divider having separate variable resistance means coupled to each of said deflecting elements, such variable taps being mechanically coupled together for simultaneous control of the differential voltage; and means for deriving separate output signals from said first anode and said second anode respectively, the magnitude of the output signal at each of said anodes being dependent upon the differential voltage applied to the respective deflecting plate.

References Cited in the file of this patent

UNITED STATES PATENTS

| | | |
|---|---|---|
| 2,265,311 | Preisach et al. | Dec. 9, 1941 |
| 2,273,673 | Van Loon | Feb. 17, 1942 |
| 2,375,948 | Roberds et al. | May 15, 1945 |
| 2,510,623 | Dome | June 6, 1950 |
| 2,547,107 | Anderson | Apr. 3, 1951 |
| 2,553,735 | Adler | May 22, 1951 |
| 2,832,847 | Goldstine | Apr. 29, 1958 |